No. 789,962. PATENTED MAY 16, 1905.
J. A. CALLAHAN, Jr.
FLUSH VALVE.
APPLICATION FILED OCT. 29, 1903.
2 SHEETS—SHEET 1.
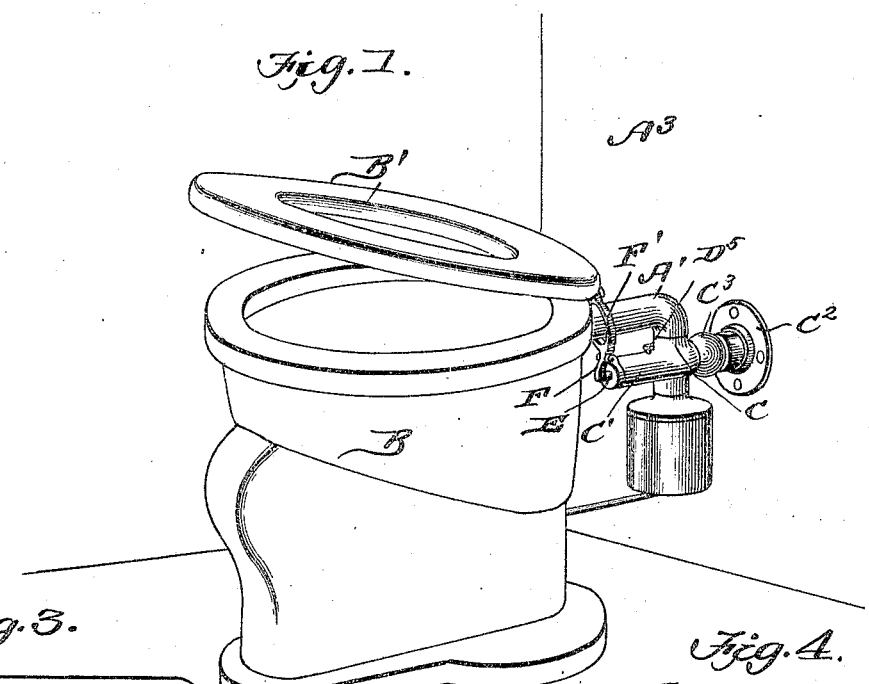
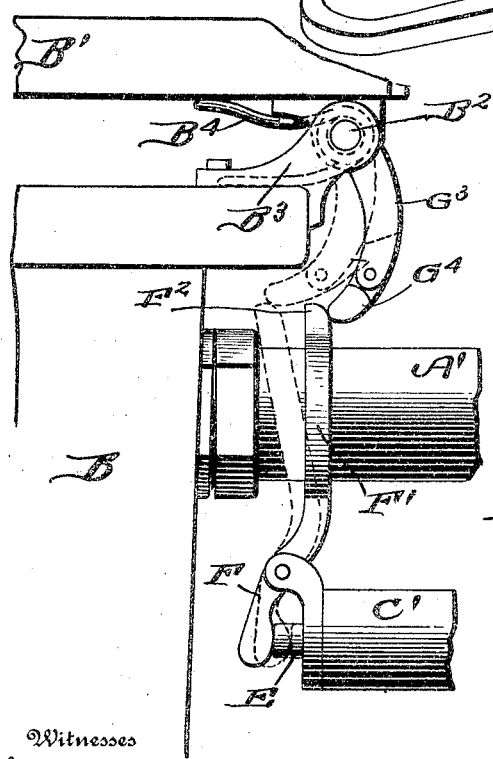
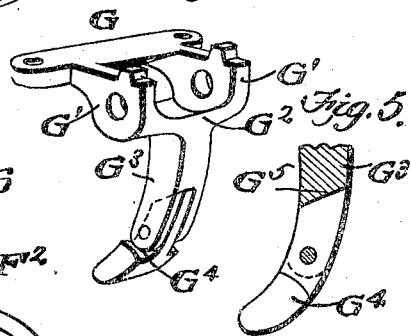
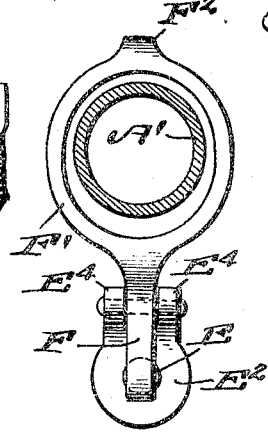
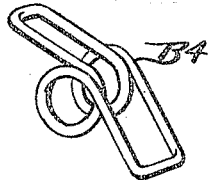
Inventor
J. A. Callahan Jr.
Witnesses
By
Attorneys

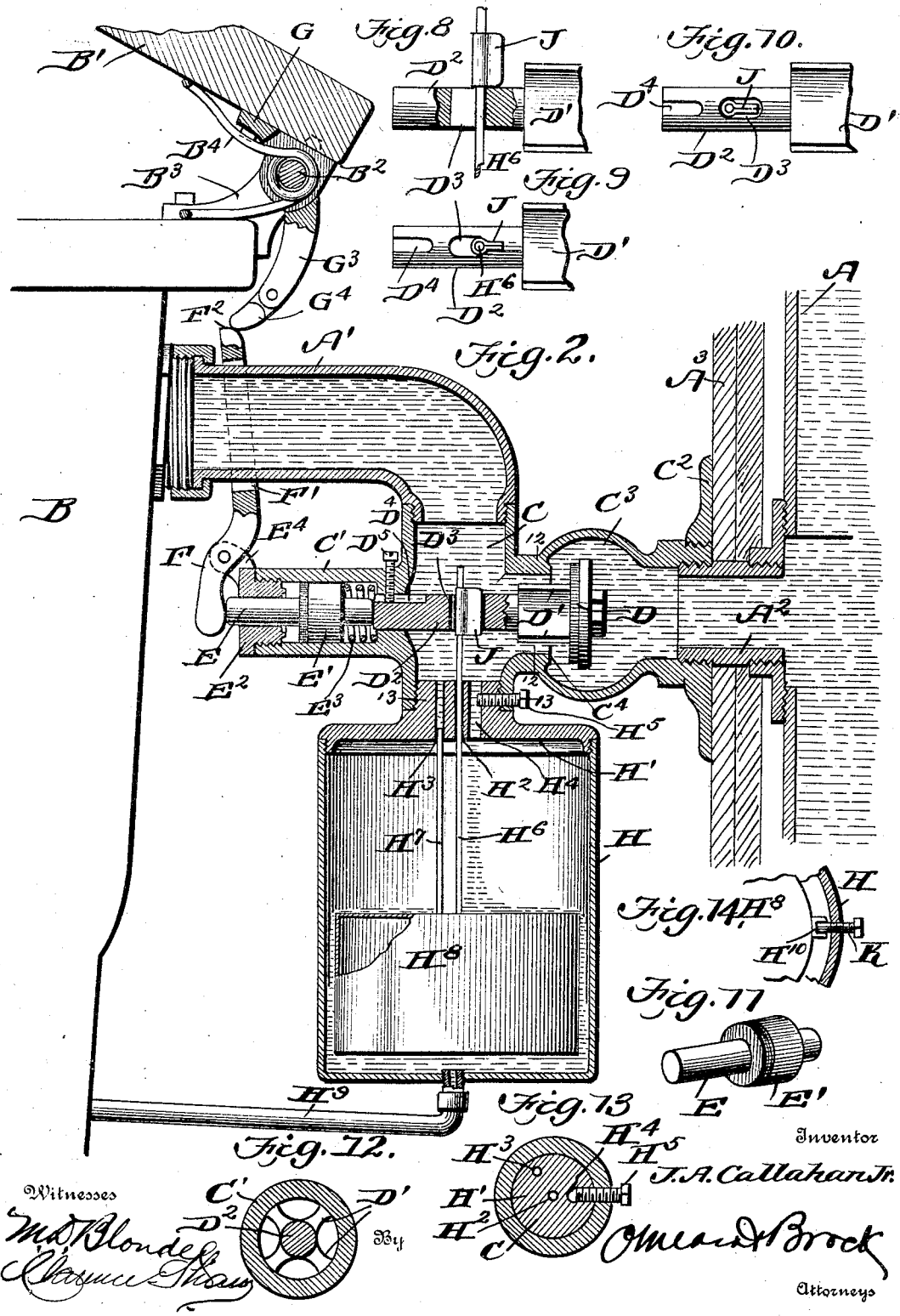

No. 789,962. Patented May 16, 1905.

UNITED STATES PATENT OFFICE.

JOSEPH ABNER CALLAHAN, JR., OF ANNISTON, ALABAMA.

FLUSH-VALVE.

SPECIFICATION forming part of Letters Patent No. 789,962, dated May 16, 1905.

Application filed October 29, 1903. Serial No. 179,025.

*To all whom it may concern:*

Be it known that I, JOSEPH ABNER CALLAHAN, Jr., a citizen of the United States, residing at Anniston, in the county of Calhoun and State of Alabama, have invented a new and useful Improvement in Flush-Valves, of which the following is a specification.

My invention is an improvement in flush-valves, and has for its object a valve adapted to open quickly and close slowly, permitting a volume of water to enter a bowl and pipe suddenly and cutting it off gradually, both operations being performed automatically.

A further object is to provide a device of this character which can be attached to a main or service pipe, eliminating the usual tank arrangement and avoiding the frequent leakage due to same; and a still further object is to provide a device of this kind which shall be practically noiseless in operation.

My invention consists in the novel features of construction and arrangement of parts hereinafter described, particularly pointed out in the claims, and shown in the accompanying drawings, in which—

Figure 1 is a perspective view showing my device in position. Fig. 2 is a vertical section through my device, the valve and other movable parts being shown in elevation. Fig. 3 is an enlarged detail elevation showing the operating mechanism connected to the bowl-seat and coacting parts. Fig. 4 is a perspective view of the parts attached to the seat. Fig. 5 is a detail view, partly in section, of the pivoted shoe. Fig. 6 is a detail view in elevation of the pivoted member coacting with the part shown in Figs. 4 and 5, the pipe being in section. Fig. 7 is a detail perspective view of the spring used in connection with the seat. Fig. 8 is a detail elevation showing the plate for locking the valve, the valve-stem being partly in section. Figs. 9 and 10 are plan views of Fig. 8, showing the plate in operative and inoperative position. Fig. 11 is a perspective view of a plunger. Fig. 12 is a section on the line 12 12 of Fig. 2. Fig. 13 is a section on the line 13 13 of Fig. 2. Fig. 14 is a modified form of float-guide.

As will be seen from Fig. 1, my device is small and occupies but little room, the overhead tank and chain being done away with. Generally speaking, the device may be described as consisting of two parts—the inclosed parts and the exterior uncovered parts, the former being arranged in the pipe and vessel interposed between the service and flush pipes and the latter being mainly carried by the seat.

Referring to the drawings, A represents a service or main supply-pipe, and A' a flush-pipe leading to the bowl. A branch or plug $A^2$ leads through the wall $A^3$ to the interior.

My attachment comprises a pipe-section having the vertical chamber C and the horizontally-extending cylinder C', which extends to a point below the rear of the seat, the portion C of the interposed pipe-section being attached at its upper end to the rear end of the flush-pipe A'. To the rear of the vertical chamber C is arranged a spherical valve-chamber $C^3$, which chamber has a threaded extension at the rear, which extension is connected to the coupling $A^2$. This coupling is connected at its inner end to the main or service pipe A. A circular wall-plate $C^2$ surrounds the end portion of the valve-chamber $C^3$ and serves to hold it in position, as shown in Fig. 2. Between the vertical portion or chamber C and the chamber $C^3$ a valve-seat $C^4$ is formed. A hard-rubber valve D of the Jenkins type is arranged in the valve-chamber and has a stem $D^2$ extending transversely through the chamber C. The valve D has suitable blades or wings D', which slide in the opening through the valve-seat and serve to guide the valve and center the stem. The stem $D^2$ is longitudinally slotted, as shown at $D^3$, and is grooved at its free end, as shown at $D^4$. A screw $D^5$ works downward through the wall of the chamber C and extends into the groove $D^4$, holding the valve-stem against rotation. The cylinder C' is integral with the front wall of the chamber C, and the valve-stem D is adapted to extend therein. A plunger E, having a piston E', is arranged in the cylinder C', and the plunger-rod works through a plug $E^2$, threaded into the forward end of the cylinder. At its inner rear end the rod E bears against the forward end of the valve-stem. A coiled spring $E^3$ is arranged around the rod E and bears against the piston E', tending to force it to the front portion of the cylinder. The plug E² has forwardly-projecting ears E⁴ formed on it, between which is pivoted the downwardly-extending arm F of a ring F', which ring has an upwardly-projecting lug F² diametrically opposite the downwardly-extending arm F. When arranged in position, the ring encircles loosely the flush-pipe A', the lug F² being above the pipe.

Secured to the under side of the seat B' is a plate G, which has downwardly-extending perforated parallel lugs G', the lower portions of the lugs being connected by an integral cross-piece, as shown at G². From this cross-piece depends a curved arm G³, bifurcated at its lower end, and in this bifurcated portion is pivoted the shank of a shoe G⁴. The inner end of the bifurcation is formed with a forwardly and downwardly inclined wall, and the upper end of the shoe-shank is beveled to fit said wall, as shown at G⁵. It will be observed that the pivotal point is adjacent the lower end of the arm G³ and also the lower end of the shank portion of the shoe. A suitable pintle B² passes through the perforations of the lugs G' and has its ends journaled in a bracket B³, and a rectangular spring member B⁴ has a coil formed in each side member, the pintle passing through the coils. One end of this spring bears downwardly on the rear portion of the bowl and the other end bears upwardly on the seat and tends to hold same in a partly-elevated position. When these parts are assembled, as shown in Fig. 3, the shoe G⁴ is in position to be brought into contact with the lug F², carried by the ring F'.

The vertical chamber C is downwardly open and interiorly threaded in its lower slightly-contracted portion. A vessel H, preferably cylindrical in form, depends from this chamber, the vessel having a removable cover H' threaded into it, and the cover has an upwardly-extending exteriorly-threaded neck portion fitting into the lower threaded portion of the chamber C. The neck portion is formed with a central aperture H², a small aperture H³, and an opening H⁴, all communicating with the vessel H and chamber C. A threaded plug H⁵ works transversely through the neck portion and extends into the opening H⁴, by which means the size of the opening may be regulated. A stem H⁶ works vertically through the central perforation H², and a guide-stem H⁷ works in the opening H³, a float H⁸ being connected to the lower ends of the stems, the stem H⁷ serving to hold the float against rotation. In the bottom of the vessel H is a small aperture in which is secured one end of a drain-pipe H⁹, the pipe leading to the bowl B. An elongated plate J is carried at the upper end of the rod H⁶ and is shown as being formed by bending a rectangular plate upon itself around the stem. This plate is so arranged that it is adapted to rest in the slot D³ in the valve-stem when the float is in its lowest position and to rise out of said slot as the float rises.

The operation of my device is as follows, assuming that the valve is closed and that the plate J is resting on the valve-stem D² adjacent the slot, thus holding the float in an elevated position: The seat is partially elevated, and the arm G³ and shoe G⁴ are in the position shown in dotted lines in Fig. 3. When the seat is depressed, the shoe G⁴ is carried to the rear of the lug F², as will be readily permitted by the pivoting of the shoe. When the seat again assumes its normal position, under the influence of the spring B⁴ the shoe is forced forward against the lug F² and carries the lug F² with it, the ring F' being forced into the position shown in dotted lines in Fig. 3, the arm F forcing the plunger-rod E, which forces the valve-stem rearward and unseats the valve D. The rearward movement of the stem brings the slot D³ in alinement with the plate J, and the plate drops into said slot, allowing the float to fall and locking the valve open. As soon as the valve is opened water from the service-pipe will rush through the coupling A², valve-chamber, chamber C, and through the flush-pipe to the bowl. Some of this water, however, will pass through the opening H⁴ into the vessel H, raising the float as the vessel fills. As soon as the float reaches the proper height the plate J will be lifted entirely out of the slot D³, unlocking the valve, and the force of the current of water, as the spring E³ will have by this time again forced the plunger outward, will force the valve to its seat. The water in the vessel H will gradually drain off through the pipe H⁹; but the float will be suspended by reason of the position of the plate J, which will be held up by the valve-stem, as at the commencement of the cycle described.

It will be noted that the plunger-rod E is not connected to the valve-stem and is therefore free to be projected outward by its spring, leaving the valve open and offering no resistance to its closure. When the shoe strikes the lug F² on the rising of the seat, it forces it suddenly forward; but as the shoe completes the arc in which it travels it permits the lug to slip back under the influence of the spring-actuated plunger bearing on the arm F to the position shown in full lines in Fig. 3, the shoe occupying the position shown in dotted lines in the same figure when the seat is raised, both lug and shoe occupying the position shown in full lines when the seat is depressed.

In Fig. 14 I have shown a slight modification which consists in having a screw K, working through the side of the vessel H and having its inner end extending into a channel-way H¹⁰, arranged on the side of the float H⁸. This prevents the rotation of the float and is substituted in place of the guide-stem H⁷.

Having thus fully described my invention, what I claim as new, and desire to secure by Letters Patent, is—

1. The combination with a pipe-section having a valve-seat formed therein, a valve, a slotted valve-stem, a vessel having communication with a portion of said pipe-section, a float in the vessel, a stem on the float passing through the slot in the valve-stem, a plate secured to the stem of the float, the plate being adapted to drop into and rest in said slot when the valve is unseated, and means for unseating the valve.

2. The combination with a bowl and seat, of a flush-pipe, a service-pipe, of a pipe-section interposed between the service and flush pipes, a valve in said section adapted to be seated by pressure of water, a spring adapted to hold the seat in an elevated position, means pivotally connected to the seat and pipe-section adapted to force the valve from its seat on upward movement of the bowl-seat, a vessel arranged adjacent the pipe and having communication therewith, a float in said vessel, means carried by the float adapted to lock the valve in an open position when the float falls and to release the valve when the float rises, and means for draining off water from said vessel.

3. A device of the kind described comprising a bowl having a hinged seat, a spring adapted to hold said seat in a partially-raised position and to lift it to that position when depressed, a flush-pipe connected to the bowl, a service-pipe, an intermediate pipe-section having a valve-chamber and a vertical chamber therein, a valve-seat arranged intermediate the chambers, a valve arranged in the valve-chamber and adapted to be seated by pressure of water running through the pipe-section, means connected to the seat of the bowl adapted to force the valve from its seat when pressure is removed from the bowl-seat, a vessel arranged below the pipe-section, a float therein, means for normally holding said float in an elevated position and for permitting said float to drop when the valve is opened, means carried by the float adapted to lock the valve against return movement to its seat while the float is out of its normal position, and means for admitting water to the vessel and returning the float to its normal position when the valve is opened.

4. A device of the kind described comprising a pipe arranged intermediate a service and a flush pipe, the said pipe being divided into two chambers, a valve-seat in one of said chambers, a valve adapted to be seated and held in the seat by water-pressure from the service-pipe, a slotted valve-stem extending transversely across the other chamber, a cylinder extending horizontally from said chamber, the end of the valve-stem projecting into said cylinder, a plunger-rod adapted to slide in said cylinder, having one end projecting from the cylinder and the other end being adapted to engage the free end of the valve-stem, a spring adapted to normally hold the forward end of the plunger projected without the cylinder, means for forcing said plunger inward when the seat is raised, a spring adapted to raise the seat, a vessel adjacent the pipe-section and having communication with the vertical chamber, a float in the vessel, means connected to the float for locking the valve open when the float is in its lowest position, and means for draining off water from said vessel.

JOSEPH ABNER CALLAHAN, Jr.

Witnesses:
  J. A. CALLAHAN,
  J. O. TYSON.